Nov. 23, 1954
R. C. CHATTIN
2,694,969
ENCIRCLING SHIELD FOR GROUNDWORKING TOOLS
Filed March 24, 1952
2 Sheets-Sheet 1
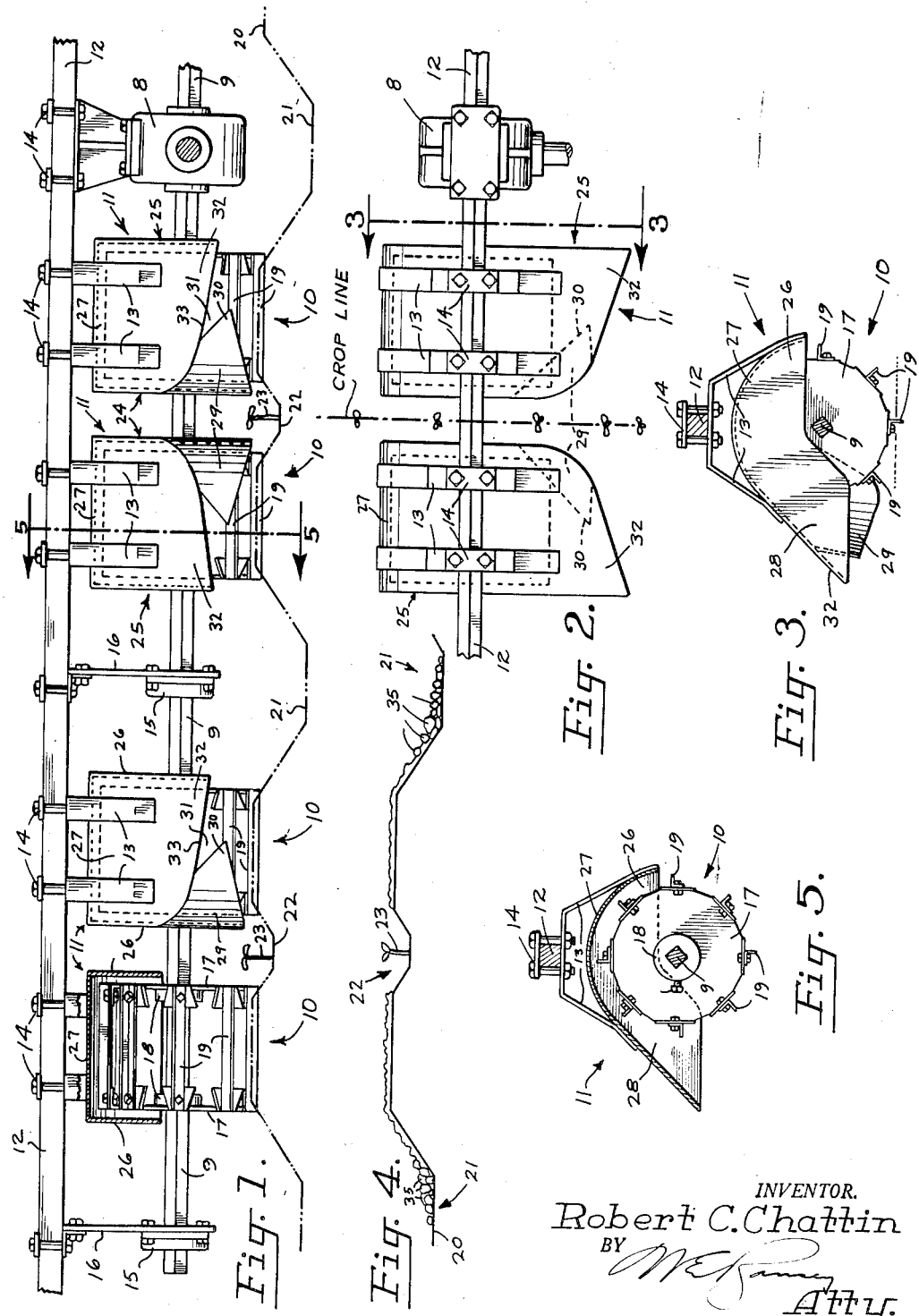
INVENTOR.
Robert C. Chattin
BY
Atty.

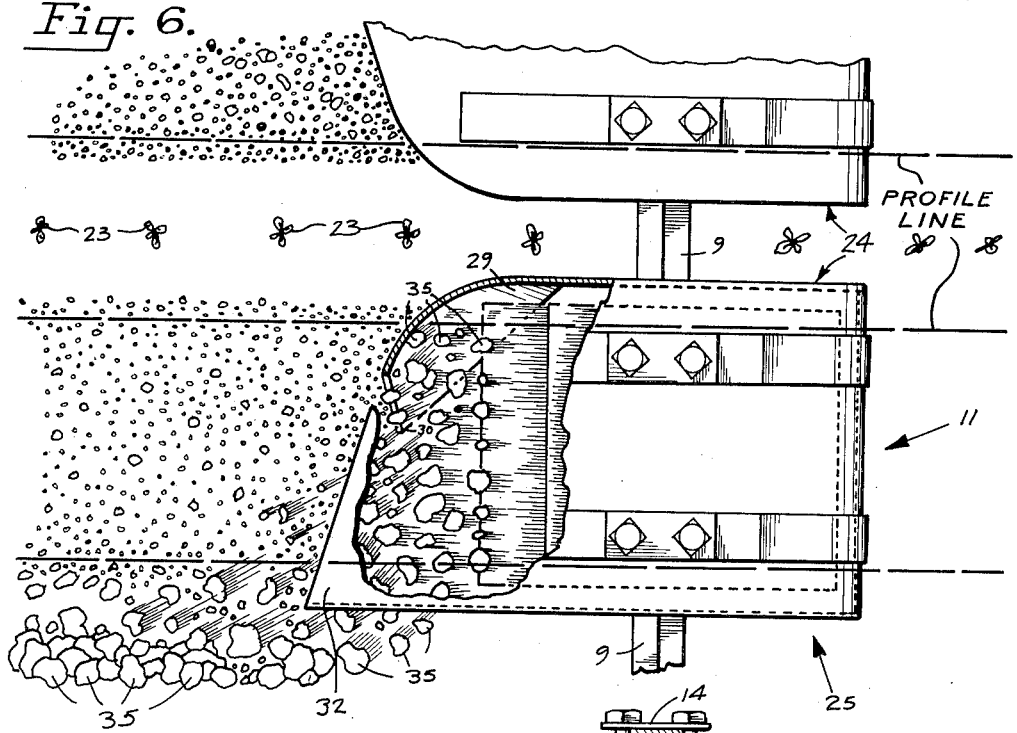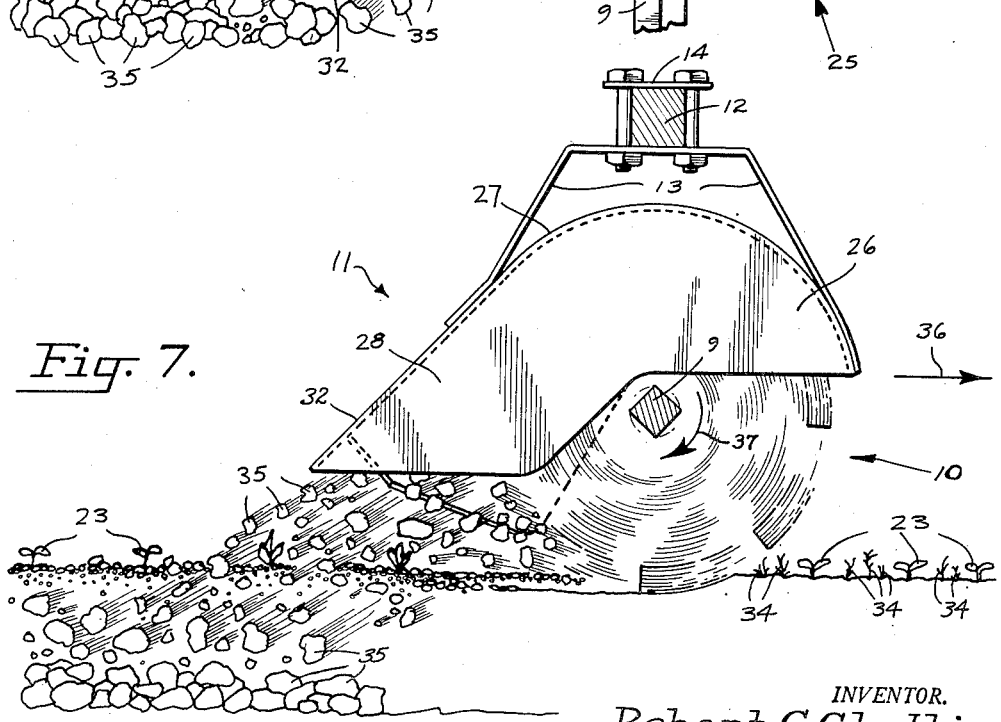

United States Patent Office 2,694,969
Patented Nov. 23, 1954

2,694,969

ENCIRCLING SHIELD FOR GROUNDWORKING TOOLS

Robert C. Chattin, Boise, Idaho

Application March 24, 1952, Serial No. 278,254

10 Claims. (Cl. 97—188)

My invention pertains to a rotary mulcher and shield mechanism for the cultivation of row crops and, more specifically, for the cultivation of those irrigated row crops which are planted in shallow depressions having mounds on each side thereof. Cotton, for example, in the San Joaquin Valley of California, often is planted along the bottom of such a shallow depression and moisture is supplied through irrigation laterals which extend parallel the planted depression on both sides thereof but separated by the intervening mounds. As is apparent, the cultivation of such an irrigated growing area presents several unique problems. However, in a generic sense, the instant invention is an improvement upon that found in the copending application, Ser. No. 83,579, filed March 26, 1949, entitled Row Crop Cultivator, of which I am assignee of a one-half interest, and is a companion to that found in my copending application, Ser. No. 327,641, filed December 23, 1952, and entitled Groundworking Tool With Oblique Deflecting Shield.

In the hot, dry farming areas of California's San Joaquin Valley, cotton is grown in multi-acre fields having a corrugated appearance with long alternate mounds and depressions. By one typical method, alternate ones of the depressions are planted with rows of cotton and the other alternate depressions serve as irrigation ditches or laterals, the mounds merely serving to separate and bound the depressions. This somewhat peculiar arrangement of the fields is made necessary by the climate and the soil type. Thus, little or no rainfall is had during the cotton growing season and the daytime temperature often exceeds 100° F. Accordingly, the cotton plants must be irrigated but the exposed parts thereof must be protected from direct contact with the water. To this end, those depressions which serve as irrigation ditches carry the moisture to a point which is spaced laterally, by a mound, from the growing plants. Thereafter, hydroscopic or subterranean action is depended upon to bring the moisture laterally through the mound and under ground to the roots of the cotton plants. By actual experience, it has been found that this method of irrigation and this method of planting produce a superior yield of a quality cotton crop. At the same time, it is evident that the efficiency of the irrigation procedure directly is related to the porosity of the soil, its condition of cultivation, and the weed growth along the mounds.

Heretofore, it has been general practice to cultivate, to eliminate weed growth, and to enhance the irrigation of the above described cotton growing areas in either one of two ways. Firstly, migratory farm labor may be utilized manually to hoe and to cultivate about the plants and along the mounds in order to break up the crusted, sun-baked soil, to eliminate weeds, and to promote the underground movement of moisture. However, since the wages for migratory Mexican and other farm labor have risen sharply during the period following World War II, manual cultivation is becoming prohibitive in cost. The second method of cultivation makes use of one of a variety of mechanical, tractor drawn cultivators now on the market. Generally, these cultivators either tear, mulch, or shear the soil along the mounds in mechanical simulation of the manual hoeing above mentioned. To the best of my knowledge, however, each of these mechanical cultivators is deficient in certain aspects and none can cultivate as close to the growing crop as is desirable to produce a maximum yield. Thus, a young cotton plant resembles a bean plant and it has a thin, match-like stem which is quite fragile and is unable, successfully, to resist lateral bending or crushing. On the other hand, an efficient cultivation of the growing area requires that the soil be worked to within approximately two inches of the thin stems both to eliminate weeds and to enhance the soil condition for irrigation. These factors limit the cultivation technique and machinery employed since the young plants should not be damaged.

Yet another factor must be considered in the cultivation of depression planted, irrigated cotton. This factor is the soil type which, in the San Joaquin Valley, is quite heavy and, during the hot, dry growing season, becomes dry, sun-baked, and crusted over. When a mechanical cultivation of this soil is attempted, relatively large clods and chunks of soil are broken up and thrown about. Because the cotton plants are in the bottom of unprotected depression, these clods and chunks, if their direction of movement is not controlled, roll down the inclined sides of the depression and shear off or bury the fragile, thin stemmed plants. Thus, previous attempts mechanically to cultivate crops of this type have proceeded along the mounds on a line spaced laterally from the crop line six inches or more in order that the clods and chunks will not roll down into the planted depressions. This laterally removed cultivation is not sufficient and many farmers follow up with close-in manual hoeing. In view of this prior art, it is a particular object of my invention to provide a rotary mulcher and shield mechanism which will cultivate quite closely to depression planted row crops (to within approximately two inches of the crop line) yet which will protect the growing plants from the clods and chunks broken up by the cultivation process.

To the above end, I provide a novel shield mechanism for a rotary cylindrical mulcher, the shield mechanism serving to encompass and bound the mulcher so as to control and direct the movements of the soil and clods thrown about by the mulcher during operation. In particular, the shield mechanism carries a deflector plate which extends vertically down and laterally in from the crop line side of the shield and is curved on a lateral sweep toward the adjacent irrigation lateral. This deflector plate physically underlies a portion of the crop line side of the mulcher and it extends laterally away from the plants to a point approximately centrally of the sides of the mulcher. Accordingly, as the mulcher cuts, cultivates, and fluffs the soil and as this soil is projected rearwardly at high velocity, the deflector plate and shield will deflect that portion of the projected soil which is adjacent the crop line. More particularly, the large clods and chunks will ricochet off the deflector and be directed away from the crop line and toward the irrigation laterals rather than toward the planted depressions. At the same time, this continuous cultivation and high speed deflection process further will break up and condition the soil to enhance the subterranean irrigation, yet the protection offered will allow the mulcher to operate within approximately two inches of the crop line on both sides thereof. Such a close cultivation is considered to be of superior utility in the farming areas under discussion.

A further object of my invention is to provide a rotary mulcher and shield mechanism for depression planted row crops which, after mulching, fluffing, and cultivating the area closely adjacent the crop line, immediately will project the cultivated soil laterally away from the crop line in order further to break up the soil and, at the same time, to protect the thin fragile crop from physical damage.

The above and other objects and advantages inherent in and encompassed by my invention will become apparent from the ensuing description, taken in conjunction with the accompanying drawings, wherein:

Fig. 1 is a rear view of a tractor mounted rotary mulcher and shield mechanism constructed in accord with my invention and shown in place straddling two depression planted crop lines;

Fig. 2 is a top plan view of two of the mulcher and shield mechanisms shown in Fig. 1, this figure more particularly indicating the allochiral cooperative relationship of the two units so the soil and clods on both sides of the crop line are deflected away from the plants;

Fig. 3 is a detail view, taken substantially on the line 3—3 of Fig. 2, more particularly indicating the manner in which the deflector plate is curved on a lateral sweep in and under a portion of the mulcher to protect the plants;

Fig. 4 is a cross-section view through a cotton planted area, similar to Fig. 1, showing somewhat diagrammatically the condition of the area after cultivation by the mechanism of the instant invention;

Fig. 5 is a section view, taken substantially on the line 5—5 of Fig. 1, showing the encompassing and bounding relationship of the shield to the mulcher; and Figs. 6 and 7 are related top and side views, Fig. 6 being partially broken away, illustrating diagrammatically the operation of my invention with respect to a row of fragile young cotton plants, the movement of the cultivated soil and clods being indicated by follow lines and the rotation of the mulcher and the forward travel of the entire cultivating unit being indicated by direction arrows.

To the end that a setting will be provided for my invention, the initial preparation of a depression and mound planting area will be explained. In the San Joaquin Valley of California, large multi-acre fields are devoted exclusively to cotton and these fields initially are plowed and cultivated. Thereafter, a lister is operated back and forth across the cultivated field to pile up alternate mounds and depressions. After listing, a former may be employed if those depressions in which the cotton is to be planted are to be made more shallow than the depressions which serve as irrigation laterals. Finally, after forming, alternate ones of the depressions are planted with cotton and further cultivation is unnecessary until the seeds sprout and grow a few inches.

As the growing season progresses, weeds infest the entire area of cultivation and the hot sun bakes and crusts the soil. Accordingly, it then becomes necessary to cultivate about the growing young plants and along the mounds in order that weeds may be cut off and their growth inhibited, the crusted soil may be broken up, fluffed, and mulched, and the passage of moisture from the irrigation laterals through the mounds to the roots of the plants may be enhanced. It is such a cultivation with which the instant invention is concerned.

In Fig. 1, I have shown two of the four units which constitute a "four row" mulcher. These units are shown as they appear from the rear while straddling two cotton planted depression areas. The entire cultivator mechanism, as will be understood by those skilled in the art, is suspended from a tractor and the working parts rotatively are driven from the power take-off shaft of the tractor. An example of one improved power transfer mechanism which may be used to transfer the rotational drive of the power take-off shaft of a tractor to the illustrated cultivating units is disclosed in my copending application Serial No. 278,256, filed March 24, 1952, and entitled Power Take-off Mechanism for Tractors. In Fig. 1 of the instant drawings, however, I have shown only that portion of the power train which terminates with a gearing in a housing 8, this gearing being used to drive a laterally elongated rotatable drive shaft 9 which protrudes from both sides of the housing. As shown, the various rotary mulchers 10 are carried upon this drive shaft 9 for rotation therewith.

As further is evidenced in Fig. 1, each of the mulchers 10 is provided with an encompassing and bounding shield mechanism 11. To mount these shields upon the tractor, an elongated frame bar 12 is carried pendent from the tractor above and parallel to the drive shaft 9. Two U-shaped brackets 13 are fixed to each of the shields 11 and these are hung from the frame bar 12 at spaced points as indicated at 14. Further, the drive shaft 9 is supported rotatably from the frame bar 12 at spaced points therealong by journal bearings 15 and hanger straps 16. Thus, the drive shaft 9 will rotate the mulchers 10 as a unit yet the shields 11 are supported from the frame bar 12 and are fixed against rotation.

In detail, each of the mulchers 10 is provided with two parallel disks 17 which are fixed to the drive shaft 9 by means of laterally adjustable collars 18 (see Fig. 1). Peripherally, the disks 17 carry a plurality of parallel blades 19 which are spaced equal radial distances from the drive shaft to define a cylindrical outline. When rotated, the blades 19 to serve to mulch, fluff, and to project the soil rearwardly at high velocity.

The function of the mulcher and shield mechanism most easily is understood with reference to a planting area. To this end, I have shown a profile line 20 (Fig. 1) and have indicated, at 21, those depressions which serve as irrigation laterals and, at 22, those more shallow depressions which serve as planting areas. A thin stemmed cotton plant 23 has been shown in each of the planted depressions to illustrate the location of the crop line. Thus, the mulchers 10 and shields 11 are provided in correlated pairs straddling the planted depressions 22 and the cotton plants growing therein. Further, each of the shields 11 may be said to have an inboard side 24 and an outboard side 25 with relationship to the growing crop line, the inboard side being located closely adjacent the crop line and the outboard side being spaced laterally therefrom and toward the corresponding irrigation laterals 21.

Each of the shields 11 defines a hollow, substantially semi-cylindrical body member bounded by two laterally spaced and parallel flat side walls 26 and by a curved top wall 27. The curved top wall 27, in turn, spans the distance between and is joined to the side walls 26 closely to bound and to encompass the corresponding cylindrical mulcher 10.

Turning to Figs. 3 and 7, each of the outboard side walls 26 is provided with a flat skirt portion 28 which extends vertically down and longitudinally back from the axis of the semi-cylindrical body member. Each of the inboard side walls, in turn, merges into and is joined with a deflector plate 29, which is welded or otherwise joined therewith. This deflector plate (see Figs. 2, 3, and 6) curves on a lateral sweep down and laterally under that portion of the corresponding mulcher 10 which is located immediately adjacent the crop line. Laterally, the deflector plate extends away from the crop line and terminates in an elongated angular or triangular point 30. This point 30 is located centrally intermediate the side walls 26 and is spaced vertically or longitudinally from the remainder of the shield to bound an angular opening 31 (see Fig. 1). In operation, a certain portion of the mulched soil is projected rearwardly through the opening 31 whereas a majority of that soil projected by the inboard side of each unit is deflected by the plate 29 and the triangular point 30. Thus, substantially no large clods or chunks of soil will be directed any closer to the crop line than the opening 31.

The curved top wall 27, as indicated in Figs. 3, 5, and 7, terminates rearwardly in a tangential flat rear wall portion 32. This rear wall portion 32 spans the distance between the deflector plate 29 and the corresponding skirt portion 28 and the lower margin thereof (see 33 in Fig. 1) extends laterally up at an oblique angle to the side walls 26. At one side of the shield, the lower margin 33 lies on a curve which defines the merger or joinder line between the deflector plate 29 and the flat rear wall 32. Thus, the inboard side of each shield extends vertically down and much closer to the ground than does the outboard side thereof. This disposition of the various elements of each shield 11 is of critical importance since it serves to protect the crop against physical damage yet allows a thorough cultivation to take place.

As previously explained, Figs. 6 and 7 are somewhat diagrammatic and are provided to illustrate the operation of my rotary mulcher and shield mechanism in a typical field of cotton such as is grown in the San Joaquin Valley. Thus, Fig. 6 is a top view of a planting area in which the "profile line" is shown at the margin of a mound and immediately adjacent the side of a planted depression. As explained with relation to the prior art, the large clods and chunks of soil (35) must not be thrown beyond or deposited inboard of this profile line or they will roll down the sides of the depression and shear off or bury the fragile, thin stemmed cotton plants 23. With my inventive mechanism, however, the soil can be cultivated and broken up with no danger that this contingency will take place.

To this end, it must be remembered that the soil itself is heavy and sun-baked and quite often has a caked hard layer of impervious soil on top. Further, as illustrated at 34 in Fig. 7, the mounds and the areas closely adjacent the cotton plants 23 are infested with a heavy growth of weeds. Still further, the efficient use of a hygroscopic or subterranean irrigation method requires that the soil be broken up, cultivated, and fluffed so as to provide a more porous and water receptive mass.

In operation, the mulcher and shield mechanism above described is tractor mounted and the operator positions the "four row" unit straddling four of the planted row crops as shown in Figs. 1, 6 and 7. Thereafter, the tractor is driven longitudinally down the rows at a uniform speed and the power take-off shaft is actuated to rotate the drive shaft 9. Rotation of the drive shaft 9 causes the various mulcher units 10 to much, cut, fluff, and project the soil rearwardly as shown in Figs. 6 and 7. In these latter figures, I have shown a mass of fine soil and a number of large clods, indicated at 35, as they appear during the act of cultivation. Thus, it will be seen that the inboard side 24 of each shield and mulcher is positioned closely adjacent the growing cotton plants (approximately two inches therefrom) yet the clods 35 which leave the mucher and the confining configuration of the shield all are deposited either on top of the adjoining mound or in the adjacent irrigation lateral. That is to say, operation of the muchers 10 projects the soil upwardly and rearwardly at high velocity. This projected soil then is deflected by and is caused to ricochet off either the flat rear wall portion 32 or the deflector plate 29 in order that all large clods and chunks will be deposited outboard of the profile line in Fig. 6. Those clods which are deflected at high velocity further are broken up and cultivated, also as desired, so a continuous stream of clods, chunks, small pieces, and fine soil issues from the outboard half of each shield during operation. In practice, of course, the entire unit is moving continuously down the planted area as shown by the arrow 36 in Fig. 7 and the mulchers rotate as shown by the arrow 37 so the mulching, projecting, and deflecting is accomplished in one continuous operation.

After cultivation with my novel mulcher and shield mechanism, the area has the appearance shown in Fig. 4 and no manual labor or follow-up is required. Thus, the entire mound area has been cultivated closely adjacent the growing plants 23 and the large clods and chunks 35 either are resting along the tops of the mounds or in the adjacent irrigation laterals. It will be noted in Fig. 6 that none of the clods have been misplaced or inadvertently have escaped to roll down the sides of the planted depressions where they would shear off or bury the fragile thin stemmed plants.

In actual practice, the cotton fields of the San Joaquin Valley are cultivated but once or twice each season by my mechanism. Further mechanical cultivation is unnecessary because the cotton plants grow with sufficient rapidity soon to outstrip the weeds and the roots of the cotton spread out and are able to absorb moisture with little or no further help. However, if desired, the irrigation laterals may be cleaned to enhance the flow of water. In any event, it will be seen that I have served my inventive objects by providing a novel rotary mulcher and shield mechanism which will cultivate very close to the planted crop line yet which will protect the growing plants from damage by the flying clods and chunks which inevitably are thrown about by a thorough mechanical cultivation. Further, after mulching, fluffing, weeding, and cultivating the area closely adjacent the crop line, my mechanism immediately will project the clods of soil laterally away from the crop line in order further to break them up and, at the same time, to protect the thin fragile stems from damage and to allow the roots to develop. In this manner, the efficiency of the hygroscopic or subterranean action upon which the irrigation is dependent directly is improved both by fluffing and conditioning the soil and by inhibiting and killing the weed growth in the area. In substance, this cultivation allows the irrigation to proceed with more efficiency and a superior yield of a faster growing, quality cotton crop will be effected.

I claim:

1. A rotary mulching type cultivator for row crops, comprising an elongated rotatable drive shaft, a pair of cooperating cylindrical mulcher means mounted upon said drive shaft for rotation therewith, each of said mulchers having a plurality of peripheral blade means for mulching and projecting the soil rearwardly at high velocity, an encompassing shield means closely bounding each of said mulchers to deflect a portion of the projected soil, each of said shields having a pair of laterally spaced side walls spanned by and mutually carrying a top wall, and a deflector plate extending vertically down from and laterally in from one side of each of said shields, each said deflector plate being elongated and being curved under a portion of the corresponding cylindrical mulcher.

2. A rotary mulching type cultivator for row crops, comprising a laterally elongated rotatable drive shaft and an elongated parallel frame bar arranged thereabove, a pair of cooperating cylindrical mulcher means mounted upon said drive shaft for rotation therewith, each of said mulchers having a plurality of parallel blade means simultaneously for mulching the soil and projecting it rearwardly at high velocity, an encompassing shield means closely bounding each of said mulchers laterally to deflect a portion of the projected soil in a direction away from the other of said pair of mulchers, said shields being pendent from said frame bar and being allochiral with each having an inboard and an outboard side, a pair of laterally spaced and parallel side walls defining said inboard and outboard sides, said side walls being spanned by and mutually carrying an integral curved top wall and a flat tangential rear wall, the rear wall of each shield terminating in a lower margin which extends laterally up at an oblique angle to said drive shaft and to said side walls from said outboard to said inboard side, and a deflector plate extending vertically down and laterally in from the inside ones of said side walls, each deflector plate terminating in an angular point which is spaced vertically below said lower margin and which is located substantially centrally of the corresponding side walls.

3. A rotary mulching type cultivator for row crops, comprising a laterally elongated rotatable drive shaft and an elongated parallel frame bar arranged thereabove and partially supporting the drive shaft, said frame bar being fixed against rotation, a pair of cooperating cylindrical mulcher means spaced laterally from one another to straddle a row of crops, said mulchers being mounted upon said drive shaft for rotation therewith, each of said mulchers having a plurality of parallel cultivator blades carried at equal radial distances from said drive shaft, an encompassing shield means closely bounding each of said mulchers, said shields being pendent from said frame bar and being allochiral with each having an inboard and an outboard side, a pair of laterally spaced and parallel side walls defining said inboard and outboard sides, said side walls being spanned by and mutually carrying an integral curved top wall and a flat tangential rear wall, the rear wall of each shield terminating in a lower margin which extends laterally up at an oblique angle to said drive shaft and to said side walls from said outboard to said inboard side, and a deflector plate extending vertically down and laterally in from the inside ones of said side walls, each said deflector plate being curved on a lateral sweep and extending in and under a portion of the corresponding cylindrical mulcher, each deflector plate terminating in an angular point which is spaced vertically below said lower margin and which is located centrally of the corresponding side walls.

4. A row crop cultivator, comprising a mulcher mechanism mounted for rotation and having a plurality of parallel cultivator blades, a shield mechanism having parallel side walls and a flat rear wall, and an elongated deflector plate extending vertically down and laterally in from one of said side walls, said deflector plate extending laterally in and under a side portion of said mulcher and terminating at a point which lies substantially centrally of said side walls.

5. In combination with a row crop cultivator having an elongated rotatable drive shaft, a mulcher mounted upon said drive shaft for rotation therewith and having a plurality of cultivator blades arranged parallel to said elongated drive shaft, a shield mechanism having parallel side walls and a flat rear wall, said shield mechanism being partially supported by said drive shaft but being fixed against rotation therewith, the flat rear wall of said shield having an oblique lower margin, and a deflector plate extending vertically down and laterally in from one of said side walls, said deflector plate being curved on a lateral sweep which intercepts and underlies one end of said oblique lower margin.

6. A row crop cultivator, comprising an elongated rotatable drive shaft, a cylindrical mulcher mounted for rotation with said drive shaft and having a plurality of cultivator blades carried parallel to one another and to said elongated drive shaft, a shield mechanism having parallel side walls and an integral flat rear wall and a curved top wall encompassing and bounding said cylindrical mulcher, said shield mechanism being supported and pendent from above said drive shaft, the flat rear wall of said shield having a lower margin which extends laterally at an oblique angle to the side walls and to said drive shaft, and a deflector plate extending vertically down and laterally in from one of said side walls, said deflector plate extending laterally in and under a side portion of said cylindrical mulcher and terminating at a point which is spaced from said lower margin and which lies centrally of said side walls.

7. A deflector shield for a rotary mulcher, comprising a hollow substantially semicylindrical body member bounded by parallel flat side walls and by a curved top wall which is joined to said side walls, one of said side walls having a flat skirt portion which extends longitudinally back from the axis of the semicylindrical body member, the other of said side walls merging into a deflector plate which curves on a lateral sweep down and laterally in therefrom, said deflector plate terminating in a laterally elongated angular point which extends in a direction substantially parallel to the axis of the semicylindrical body.

8. A deflector shield for a rotary mulcher, comprising a hollow substantially semicylindrical body member bounded by parallel flat side walls and by a curved top wall which is joined to said side walls, one of said side walls having a flat skirt portion which extends vertically down and longitudinally back from the axis of the semicylindrical body member, the other of said side walls merging into a deflector plate which curves on a lateral sweep down and laterally in therefrom, said curved top wall terminating longitudinally in a tangential flat rear wall portion which spans the distance between said deflector plate and skirt portion, the lower margin of said rear wall extending laterally at an oblique angle from said other to said one side wall and terminating adjacent said other side wall in a curve defining the merger line of the deflector plate with the flat rear wall.

9. A deflector shield for a rotary mulcher, comprising a hollow substantially semicylindrical body member bounded by two laterally spaced and parallel flat side walls and by a curved top wall which spans the distance between and is joined to said side walls, one said side wall merging into a deflector plate which curves on a lateral sweep down and laterally in therefrom, the lower margin of said rear wall extending laterally up at an oblique angle to the side walls and terminating at one end in a curve defining the merger line of the deflector plate with the flat rear wall, said deflector plate terminating in a laterally elongated triangular point.

10. A deflector shield for a rotary mulcher, comprising a hollow substantially semicylindrical body member bounded by two laterally spaced and parallel flat side walls and by a curved top wall which spans the distance between and is joined to said side walls, one of said side walls having a flat skirt portion which extends vertically down and longitudinally back from the axis of the semicylindrical body member, the other of said side walls merging into a deflector plate which curves on a lateral sweep down and laterally in therefrom, said curved top wall terminating longitudinally in a tangential flat rear wall portion which spans the distance between said deflector plate and skirt portion, the lower margin of said rear wall extending laterally up at an oblique angle from said other to said one side wall and terminating adjacent said other side wall in a curve defining the merger line of the deflector plate with the flat rear wall, said deflector plate terminating in a laterally elongated triangular point, said triangular point terminating centrally intermediate said side walls and being spaced longitudinally from said lower margin to bound and to define an angular opening between the lower margin and the triangular point.

References Cited in the file of this patent

UNITED STATES PATENTS

| Number | Name | Date |
| --- | --- | --- |
| 51,031 | Fernald | Nov. 21, 1865 |
| 1,414,842 | Voelker | May 2, 1922 |
| 1,639,463 | Miller et al. | Aug. 16, 1927 |
| 2,317,188 | Hanson | Apr. 20, 1943 |
| 2,370,777 | Clark | Mar. 6, 1945 |
| 2,597,111 | Lathers | May 20, 1952 |
| 2,616,348 | Ariens | Nov. 4, 1952 |